(12) United States Patent
Schels

(10) Patent No.: US 12,412,998 B2
(45) Date of Patent: Sep. 9, 2025

(54) INTERFACE ARRANGEMENT FOR AN ELECTRIC TRACTION SYSTEM OF A VEHICLE

(71) Applicant: AUDI AG, Ingolstadt (DE)

(72) Inventor: Florian Schels, Seubersdorf (DE)

(73) Assignee: AUDI AG, Ingolstadt (DE)

( * ) Notice: Subject to any disclaimer, the term of this patent is extended or adjusted under 35 U.S.C. 154(b) by 386 days.

(21) Appl. No.: 18/073,408

(22) Filed: Dec. 1, 2022

(65) Prior Publication Data

US 2023/0178908 A1 Jun. 8, 2023

(30) Foreign Application Priority Data

Dec. 2, 2021 (DE) .......................... 102021131792.4

(51) Int. Cl.
| | |
|---|---|
| *H01R 9/16* | (2006.01) |
| *B60R 16/03* | (2006.01) |
| *H01R 43/00* | (2006.01) |

(52) U.S. Cl.
CPC .............. *H01R 9/16* (2013.01); *B60R 16/03* (2013.01); *H01R 43/005* (2013.01); *H01R 2201/26* (2013.01)

(58) Field of Classification Search
CPC .... H01R 9/16; H01R 43/005; H01R 2201/26; B60R 16/03; H02K 5/225; H02K 3/50; H02K 11/33
See application file for complete search history.

(56) References Cited

U.S. PATENT DOCUMENTS

| | | | |
|---|---|---|---|
| 6,986,677 B2 * | 1/2006 | Janssen | H01R 13/5208 |
| | | | 439/275 |
| 2021/0044053 A1* | 2/2021 | Aoki | H01R 13/502 |

FOREIGN PATENT DOCUMENTS

| | | | | |
|---|---|---|---|---|
| DE | 63 398 A1 | 8/1968 | | |
| DE | 202010000482 U1 | 6/2010 | | |
| DE | 202012011808 U1 | 3/2014 | | |
| DE | 102014011518 A1 * | 2/2015 | ......... | H01R 13/5202 |
| DE | 102014216765 A1 * | 2/2016 | ............ | B60R 16/03 |
| DE | 102018109407 A1 | 10/2018 | | |
| DE | 102018206293 A1 | 10/2019 | | |
| DE | 102019005171 A1 | 1/2021 | | |
| WO | WO 2021214121 A1 | 10/2021 | | |
| WO | WO-2021240765 A1 * | 12/2021 | ......... | B60C 23/0467 |

* cited by examiner

*Primary Examiner* — Travis S Chambers
(74) *Attorney, Agent, or Firm* — Seed Intellectual Property Law Group LLP

(57) ABSTRACT

An interface arrangement for an electric traction system of a vehicle comprises a stator housing of an electric traction motor of the electric traction system, a protective housing of a power electronics of the electric traction system and at least one contact plate of an electric interface of the electric traction motor reaching through the stator housing and the protective housing and a sealing element having the at least one contact plate reaching through the sealing element. An electric traction system for a vehicle, and a method for making a sealing element for an interface arrangement of an electric traction system of a vehicle are also provided.

10 Claims, 1 Drawing Sheet

INTERFACE ARRANGEMENT FOR AN ELECTRIC TRACTION SYSTEM OF A VEHICLE

BACKGROUND

Technical Field

Embodiments of the invention relate to an interface arrangement for an electric traction system of a vehicle. Moreover, embodiments of the invention relate to an electric traction system for a vehicle and a method for making a sealing element for an interface arrangement of an electric traction system of a vehicle.

Description of the Related Art

Interface arrangements of the mentioned kind serve primarily for electrically connecting an electric motor and an electronic module associated with the electric motor and operating the electric motor. The sealing element must electrically isolate an electric interface of the electric motor, comprising at least one contact plate, from a stator housing of the electric motor and a protective housing of the electronic module.

DE 10 2019 005 171 A1 discloses an interface arrangement for an electric motor, comprising a stator flange, an electronics unit held on the stator flange, and a unified plug unit. The unified plug unit can be arranged in a receiving space of the electronics unit of the electric motor, in order to connect in electrically conducting manner a plurality of connection wires of the plug unit to a plurality of contacts of the electronics unit.

DE 20 2010 000 482 U1 discloses an arrangement of an electric motor, a worm gear, and an electronics unit in a jointly sealed-off stainless steel housing.

In the case of an electrically propelled vehicle, the electric motor is called more precisely an electric traction motor. The electronic module in this case is usually called the power electronics.

DE 10 2018 206 293 A1 discloses an interface arrangement for an electric traction system of a vehicle. The interface arrangement has a plurality of electric contact elements, which are held in a body made of plastic.

For the cooling of the electric traction motor, oil is often situated in an interior of the traction motor bounded off by a stator housing of the electric traction motor, which flows through the electric traction motor during the operation of the electric traction motor and transports away the waste heat, especially resistive heat, generated by the operation of the electric traction motor.

Therefore, the interface arrangement often has at least one sealing element, which fluidically separates the power electronics from the interior of the electric traction motor in order to protect the power electronics and prevents a leakage of oil from the stator housing. Specifically, a passage of the interface arrangement for the at least one contact plate, through which the contact plate reaches, and moreover the stator housing of the electric traction motor and a protective housing of the power electronics are fluidically sealed off to prevent a fluid from getting through or penetrating them. In many configurations, the interface arrangement therefore comprises multiple sealing elements (see FIG. 1), each of which may have different materials, especially plastics, and be produced in an injection molding or casting process.

Due to the operation and the weather, operating temperatures of the electric traction system lie in a temperature range of $-40°$ C. to $180°$ C. Accordingly, the interface arrangement must compensate for thermally produced changes in dimension of the stator housing, the protective housing and/or the contact plate and reliably assure a complete, i.e., electrically insulating and fluidically sealing function of the interface arrangement at least during the lifetime of the electric traction motor and the power electronics.

BRIEF SUMMARY

Some embodiments provide an interface arrangement for an electric traction system of a vehicle that has a long lifetime and works reliably at any operating temperature of the electric traction system. Some embodiments provide an electric traction system for a vehicle and propose a method for producing a sealing element for an interface arrangement of an electric traction system of a vehicle.

Some embodiments include an interface arrangement for an electric traction system of a vehicle. The traction system comprises a stator housing of an electric traction motor of the electric traction system, a protective housing of a power electronics of the electric traction system and at least one contact plate of an electric interface of the electric traction motor reaching through the stator housing and the protective housing and a sealing element having the at least one contact plate reaching through it. Every electric traction system of a vehicle has such an interface arrangement, so that there are many application possibilities.

The interface arrangement is designed to provide an electrically conductive connection between the electric traction motor and the power electronics regulating or controlling the electric traction motor. The electrically conductive connection is provided by the at least one contact plate, which reaches through both the stator housing of the electric motor and the protective housing of the power electronics. The stator housing and the protective housing each have a passage for the at least one contact plate to reach through. The at least one contact plate extends through the two passages of the stator housing and the protective housing.

By the contact plate is generally meant an oblong electrically conductive element, where the term "oblong" requires the existence of a main direction of extension of the electrically conductive element. The electrically conductive element may comprise a metal or consist of a metal. The electrically conductive element can be formed, for example, as a cylinder or a plate.

The sealing element may be arranged in passages of the stator housing and the protective housing which are at least partly flush with each other, the sealing element holds the at least one contact plate, and the sealing element has the at least one contact plate reaching through it. The sealing element at the same time closes the two passages which are at least partly flush with each other and fluidically separates an interior of the electric traction motor, bounded by the stator housing, from the power electronics, located in the protective housing.

The respective passages of the stator housing and the protective housing can have identical cross section areas and be exactly flush with each other. Alternatively, the respective passages of the stator housing and the protective housing can have identical or different cross section areas that are partly flush with each other, i.e., partly overlap.

The interface arrangement may comprise three contact plates reaching through the sealing element and held by the sealing element, extending parallel to each other and being placed at a distance from each other. Most electric traction motors have three separate stator windings. Each stator winding is a contact plate and hence is coordinated with one phase of an electric voltage applied to the contact plates.

The parallel extension of the contact plates enables a simple electrical connection of the stator windings and/or the power electronics to the electrical interface of the interface arrangement each time by means of a unified plug, having sockets which correspond to the three contact plates. Of course, the electrical connection of the stator windings and/or the power electronics can be done alternatively by means of welding, single plugs, or the like. Spatial distances between the contact plates prevent a direct short circuiting of the contact plates with each other.

Ideally, the sealing element comprises a rubber, an elastomer or a silicone and/or each contact plate comprises a copper alloy or an aluminum alloy or each contact plate consists of a copper alloy or an aluminum alloy. Rubbers, elastomers and silicones are electrical insulators and are especially well suited for a sealing on account of their elastic deformability. Furthermore, rubbers, elastomers and silicones have good temperature stability in a temperature range of −40° C. to 180° C. Copper alloys and aluminum alloys have good mechanical shape stability and large electrical conductivity.

The sealing element may comprise a bonding agent for adhesion of the sealing element to the at least one contact plate. The bonding agent is a chemical substance which enables the sealing element to adhere strongly to the at least one contact plate. The bonding agent can be mixed in with the rubber or the elastomer.

In one favorable embodiment, the sealing element comprises a ferritic metal ring. The ferritic metal ring, i.e., the ferrite core, can increase the shape stability of the sealing element and dampen unwanted harmonics of an alternating electric current flowing through the at least one contact plate between the electric traction motor and the power electronics.

In other embodiments, opposite marginal regions of the stator housing and the protective housing bordering on the passages are arranged at a spacing from each other. A spacing between the stator housing and the protective housing reduces the thermal coupling of the stator housing and the protective housing. Furthermore, the spacing allows a relative thermal movement of the stator housing and the protective housing, for example, on account of a temperature gradient or on account of different thermal capacities.

The interface arrangement can comprise at least one spacing element, which is arranged between the opposite marginal regions. The spacing element connects the stator housing and the protective housing mechanically and defines the spacing between the stator housing and the protective housing in the opposite marginal regions.

Alternatively, opposite marginal regions of the stator housing and the protective housing bordering on the passages can be arranged mutually bearing against each other.

In many embodiments, the at least one contact plate comprises in one region of the sealing element at least one protrusion standing off laterally from one edge of the at least one contact plate and engaging with a recess of the sealing element. The engaging of the protrusion with the recess prevents a relative translation movement between the at least one contact plate and the sealing element.

Alternatively or additionally, the at least one contact plate in one region of the sealing element can comprise at least one passage through which the sealing element reaches. The reaching through the sealing element by the at least one contact plate prevents a relative translation movement between the at least one contact plate and the sealing element.

Some embodiments include an electric traction system for a vehicle, having an electric traction motor, a power electronics and an interface arrangement connecting the electric traction motor and the power electronics. Such electric traction systems can be installed in every electrically powered vehicle. Accordingly, embodiments of the invention may find many diverse applications.

The interface arrangement described herein has a long lifetime and functions reliably at any operating temperature of the electric traction system.

Some embodiments include a method for producing a sealing element for an interface arrangement of an electric traction system of a vehicle.

At least one contact plate of an electric interface of an electric traction motor of an electric traction system may be embedded by means of vulcanization in a sealing element of an interface arrangement of the electric traction system. Vulcanization has proved itself in other applications and brings about a good adhesion of the sealing element to the at least one contact plate, ensuring reliable tightness during the lifetime of the traction system.

One major advantage of the interface arrangement described herein is that it has a long lifetime and works reliably at every operating temperature of the electric traction system, i.e., the at least one means of contact of the stator housing and that of the protective housing is electrically insulated and the means of sealing fluidically separates the interior of the stator housing from a power electronics situated in the protective housing. A further advantage is that the interface described herein assures a long-lasting protection of the environment.

DETAILED DESCRIPTION

Figure 1:
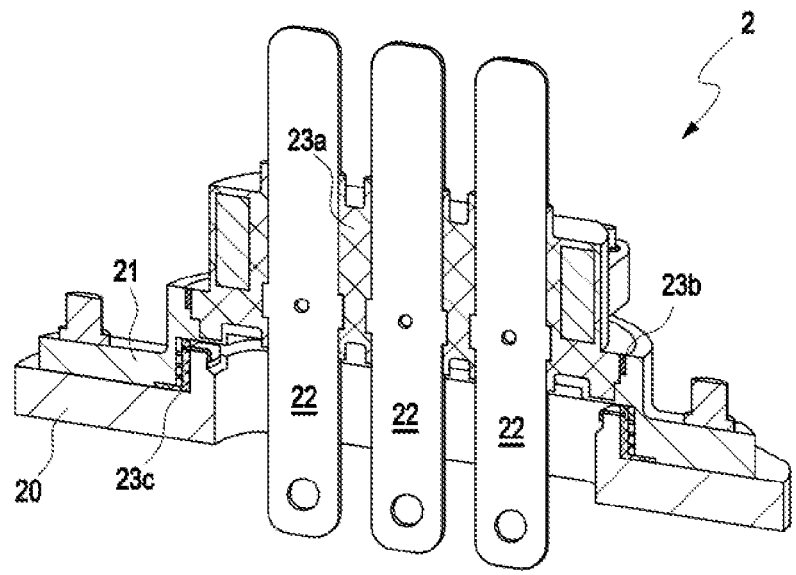
FIG. 1 shows a perspective view of an interface arrangement for a traction system of a vehicle.

FIG. 1 shows a perspective view of an interface arrangement 2 in a configuration of the prior art for a traction system of a vehicle. The interface arrangement 2 comprises a stator housing 20 of an electric traction motor of the traction system, a protective housing 21 of a power electronics of the traction system, and three contact plates 22.

Moreover, the interface arrangement 2 comprises a first sealing element 23a, which holds the three contact plates 22 and the three contact plates 22 reach through it, a second sealing element 23b, which is arranged in a gap formed between the first sealing element 23a and the protective housing 21, and a third sealing element 23c, which is arranged in a gap formed between the stator housing 20 and the protective housing 21.

Figure 2:
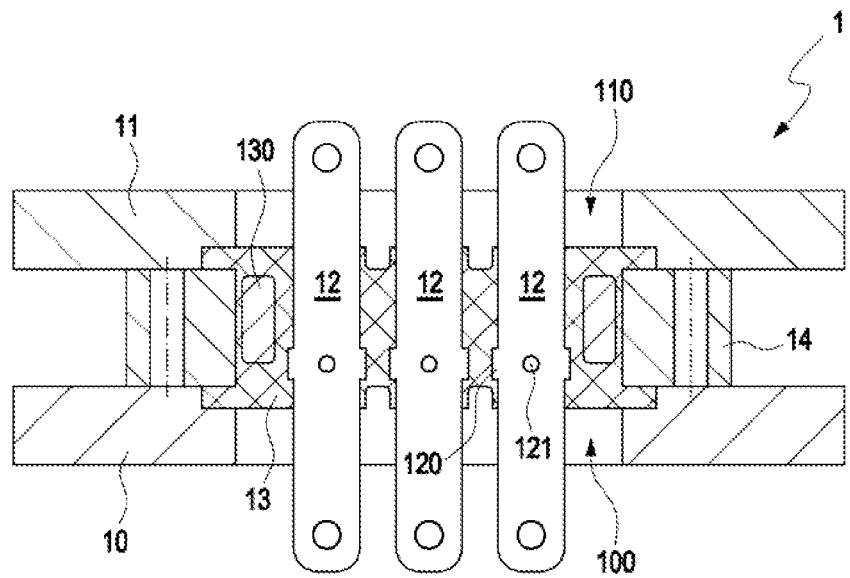
FIG. 2 shows an interface arrangement for an electric traction system of a vehicle.

FIG. 2 shows an interface arrangement 1 according to one embodiment for an electric traction system of a vehicle. The electric traction system for a vehicle comprises an electric traction motor, a power electronics and an interface arrangement 1 connecting the electronic traction motor and the power electronics. The vehicle, the electric traction motor and the Power electronics are designed customarily and will be shown here only partly or not at all.

The interface arrangement 1 for the electric traction system of the vehicle comprises a stator housing 10 of the electric traction motor of the electric traction system, a protective housing 11 of the power electronics of the electric traction system, and at least one contact plate 12 of an electric interface of the electric traction motor. The at least one contact plate 12 reaches through the stator housing 10 and the protective housing 11.

Moreover, the interface arrangement 1 comprises a sealing element 13, or more precisely a single sealing element 13, which is arranged in passages 100, 110 of the stator housing 10 and the protective housing 11 which are at least partly flush with each other. The sealing element 13 holds the at least one contact plate 12, and the at least one contact plate 12 reaches through it.

Merely as an example and not confined to this, the interface arrangement comprises three contact plates 12 reaching through the sealing element 13 and held by the sealing element 13, which extend in parallel and are arranged at a spacing from each other. The three contact plates 12 can be arranged alongside each other in a row.

Each contact plate 12 may comprise in one region of the sealing element 13 at least one protrusion 120 standing off laterally from one edge of the contact plate 12 and engaging with a recess of the sealing element 13. Alternatively or additionally, the at least one contact plate 12 in one region of the sealing element 13 can comprise at least one passage 121 through which the sealing element 13 reaches.

The sealing element 13 can comprise a rubber, an elastomer or a silicone. Each contact plate 12 can comprise a copper alloy or an aluminum alloy or consist of a copper alloy or an aluminum alloy.

The sealing element 13 may comprise a bonding agent for adhesion of the sealing element 13 to the at least one contact plate 12.

The sealing element 13 can comprise a ferritic metal ring 130.

Opposite marginal regions of the stator housing 10 and the protective housing 11 bordering on the passages 100, 110 can be arranged at a spacing from each other. Ideally, at least one spacing element 14, which is arranged between the opposite marginal regions, is included in the interface arrangement 1.

In order to produce the sealing element 13 for the interface arrangement 1 of the electric traction system of the vehicle, the at least one contact plate 12 of the electric interface of the electric traction motor is embedded by means of vulcanization in the sealing element 13 of the interface arrangement 1.

German patent application no. 10 2021 131792.4, filed Dec. 2, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An interface arrangement for an electric traction system of a vehicle, the interface arrangement comprising:
    a stator housing of an electric traction motor of the electric traction system, the stator housing configured to accommodate a stator of the electric traction motor therein, and including a stator housing passage extending therethrough,
    a protective housing of a power electronics of the electric traction system, the protective housing configured to accommodate the power electronics of the electric traction system therein, and including a protective housing passage extending therethrough, which is at least partly aligned with the stator housing passage,
    at least one contact plate of an electric interface of the electric traction motor reaching through the stator housing and the protective housing, and
    a sealing element arranged in the stator housing passage and the protective housing passage, the sealing element holding the at least one contact plate, which reaches through the sealing element, and the sealing element being in direct contact with each of the stator housing and the protective housing.

2. The interface arrangement according to claim 1, comprising three contact plates reaching through the sealing element and held by the sealing element, extending parallel to each other and being placed at a distance from each other.

3. The interface arrangement according to claim 1, in which the sealing element comprises a rubber, an elastomer or a silicone and/or each contact plate comprises a copper alloy or an aluminum alloy or consists of a copper alloy or an aluminum alloy.

4. The interface arrangement according to claim 3, in which the sealing element comprises a bonding agent for adhesion of the sealing element to the at least one contact plate.

5. The interface arrangement according to claim 1, in which the sealing element comprises a ferritic metal ring.

6. The interface arrangement according to claim 1, in which opposite marginal regions of the stator housing and the protective housing bordering on the passages are arranged at a spacing from each other.

7. The interface arrangement according to claim 6, comprising at least one spacing element, which is arranged between the opposite marginal regions.

8. The interface arrangement according to claim 1, in which the at least one contact plate comprises in one region of the sealing element at least one protrusion standing off laterally from one edge of the at least one contact plate and engaging with a recess of the sealing element and/or in which the at least one contact plate in one region of the sealing element comprises at least one passage through which the sealing element reaches.

9. An electric traction system for a vehicle, comprising:
    an electric traction motor having a stator housing,
    a power electronics having a protective housing, and
    an interface arrangement connecting the electric traction motor and the power electronics, the interface arrangement including:
        the stator housing, wherein the stator housing is configured to accommodate a stator of the electric traction motor therein, and includes a stator housing passage extending therethrough,
        the protective housing, wherein the protective housing is configured to accommodate the power electronics of the electric traction system therein, and includes a protective housing passage extending therethrough, which is at least partly aligned with the stator housing passage,
        at least one contact plate of an electric interface of the electric traction motor reaching through the stator housing and the protective housing, and
        a sealing element arranged in the stator housing passage and the protective housing passage, the sealing element holding the at least one contact plate, which reaches through the sealing element, and the sealing element being in direct contact with each of the stator housing and the protective housing.

10. A method for producing a sealing element for an interface arrangement of an electric traction system of a vehicle, the interface arrangement including:
- a stator housing of an electric traction motor of the electric traction system, the stator housing configured to accommodate a stator of the electric traction motor therein, and including a stator housing passage extending therethrough,
- a protective housing of a power electronics of the electric traction system, the protective housing configured to accommodate the power electronics of the electric traction system therein, and including a protective housing passage extending therethrough, which is at least partly aligned with the stator housing passage,
- at least one contact plate of an electric interface of the electric traction motor reaching through the stator housing and the protective housing, and
- the sealing element, wherein the sealing element is arranged in the stator housing passage and the protective housing passage, the sealing element holding the at least one contact plate, which reaches through the sealing element, and the sealing element being in direct contact with each of the stator housing and the protective housing, and the method comprising:
- embedding, by vulcanization, the at least one contact plate of the electric interface of the electric traction motor of the electric traction system in the sealing element of the interface arrangement of the electric traction system.

* * * * *